US011285947B2

United States Patent
Matsushita et al.

(10) Patent No.: US 11,285,947 B2
(45) Date of Patent: Mar. 29, 2022

(54) TRAVELING CONTROL APPARATUS

(71) Applicant: HONDA MOTOR CO., LTD., Tokyo (JP)

(72) Inventors: Satoshi Matsushita, Wako (JP); Yoshimichi Kawamoto, Wako (JP); Takashi Horiguchi, Wako (JP); Shigeru Yamawaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 16/790,239

(22) Filed: Feb. 13, 2020

(65) Prior Publication Data

US 2020/0262426 A1 Aug. 20, 2020

(30) Foreign Application Priority Data

Feb. 20, 2019 (JP) .............................. JP2019-028486

(51) Int. Cl.
*B60W 30/16* (2020.01)

(52) U.S. Cl.
CPC ....... *B60W 30/162* (2013.01); *B60W 2510/18* (2013.01); *B60W 2554/802* (2020.02); *B60W 2720/10* (2013.01)

(58) Field of Classification Search
CPC .......... B60W 30/162; B60W 2720/10; B60W 2510/18; B60W 2554/802; B60W 2520/28; B60W 2540/10; B60W 2510/182; B60W 2510/184; B60W 2540/12; B60W 30/14; B60W 30/16; B60W 40/105
See application file for complete search history.

(56) References Cited

U.S. PATENT DOCUMENTS

| 2012/0083959 A1* | 4/2012 | Dolgov | G05D 1/0276 |
| | | | 701/23 |
| 2020/0125086 A1* | 4/2020 | Switkes | G05D 1/0027 |

FOREIGN PATENT DOCUMENTS

JP 2017-043237 A 3/2017

* cited by examiner

*Primary Examiner* — Peter D Nolan
*Assistant Examiner* — Ashley L Redhead, Jr.
(74) *Attorney, Agent, or Firm* — Rankin, Hill & Clark LLP

(57) ABSTRACT

A traveling control apparatus includes: an information obtainer configured to obtain braking state information of a braking device in the host vehicle; and an ACC-ECU configured to execute traveling control including constant speed traveling control to cause the host vehicle to travel at a constant speed based on a preset vehicle speed, and follow-up traveling control to cause the host vehicle to travel so as to follow another vehicle traveling ahead of the host vehicle at a predetermined inter-vehicle distance. The ACC-ECU deactivates the ACC at a time when a braking performance index $EV1z$, derived from braking state information obtained by the information obtainer while the ACC being in operation, is deemed to be decreased by more than a predetermined first variation width $IN\_dif1$, as compared with a braking performance index $EV1a$ at a time of the ACC having been activated.

12 Claims, 4 Drawing Sheets

TRAVELING CONTROL APPARATUS

CROSS-REFERENCE TO RELATED APPLICATION

This application claims the benefit of priority to Japanese Patent Application No. 2019-028486 filed on 20 Feb. 2019, the disclosures of all of which are hereby incorporated by reference in their entireties.

TECHNICAL FIELD

The present invention relates to a traveling control apparatus to execute travelling control of a host vehicle.

BACKGROUND OF THE INVENTION

Elemental technologies to implement autonomous driving has been actively developed these days. A traveling control technique called Adaptive Cruise Control (ACC) is popular as one of elemental technologies to implement autonomous driving.

The ACC (traveling control apparatus) controls a driving system and a braking system of a host vehicle in an integrated manner to implement traveling control inclusive of constant speed traveling control to cause the host vehicle to travel at a constant speed based on a setup vehicle speed, and follow-up traveling control to cause the host vehicle to travel so as to follow another vehicle traveling ahead of the host vehicle at a predetermined inter-vehicle distance.

As an example of such a traveling control apparatus, Japanese Patent Application Publication No. 2017-043237 (hereinafter referred to as Patent Document 1) discloses one that prohibits the ACC from being activated when the degree of probability of having a fading phenomenon rises to a certain limit level (see paragraph 0069 of Patent Document 1).

The traveling control apparatus according to Patent Document 1 prohibits the ACC from being activated when the degree of probability of having the fading phenomenon rises to a certain limit level, to prevent a situation of the brake having fading phenomenon while traveling control of the ACC being in operation.

SUMMARY OF THE INVENTION

Problems to be Solved

The traveling control apparatus of Patent Document 1 however sets a limit level for prohibiting the ACC from being activated to a constant one. For this reason, if the degree of probability of having a fading phenomenon (braking performance) at the time when the ACC had been set is substantially different from that at a time immediately after the ACC has been canceled, for example, there is a case where the sensation of braking is suddenly changed. In such a case, there is a risk of the driver feeling uncomfortable with the braking operation, at a time of braking operation immediately after the ACC has been canceled, due to a change in braking performance.

The present invention has been made in view of the above circumstances, and is intended to provide a traveling control apparatus to prevent a situation of a driver feeling uncomfortable, when the traveling control is deactivated (ACC has been canceled while in operation) and the traveling control is given from the traveling control apparatus back to the driver, due to a sudden change in the sensation of braking resulting from a change in braking performance.

Solution to Problem

The invention of a first aspect solves the above-described problem and provides a traveling control apparatus to execute traveling control of a host vehicle, including: an information obtainer configured to obtain braking state information of a braking device in the host vehicle; and a traveling controller configured to execute at least one type of traveling control of constant speed traveling control to cause the host vehicle to travel at a constant speed based on a setup vehicle speed, and follow-up traveling control to cause the host vehicle to travel so as to follow another vehicle traveling ahead of the host vehicle at a predetermined inter-vehicle distance, wherein the traveling controller, as the most important feature thereof, deactivates the traveling control at a time when a braking performance index, derived from the braking state information obtained by the information obtainer while the traveling control being in operation, is deemed to be decreased by more than a predetermined variation width, as compared with the braking performance index at a time of the traveling control having been activated.

Advantageous Effects of the Invention

The traveling control apparatus of the present invention prevents a situation of a driver feeling uncomfortable, when the traveling control is deactivated and the traveling control is given from the traveling control apparatus back to the driver, due to a sudden change in the sensation of braking resulting from a change in braking performance.

EMBODIMENTS OF THE INVENTION

Figure 1:
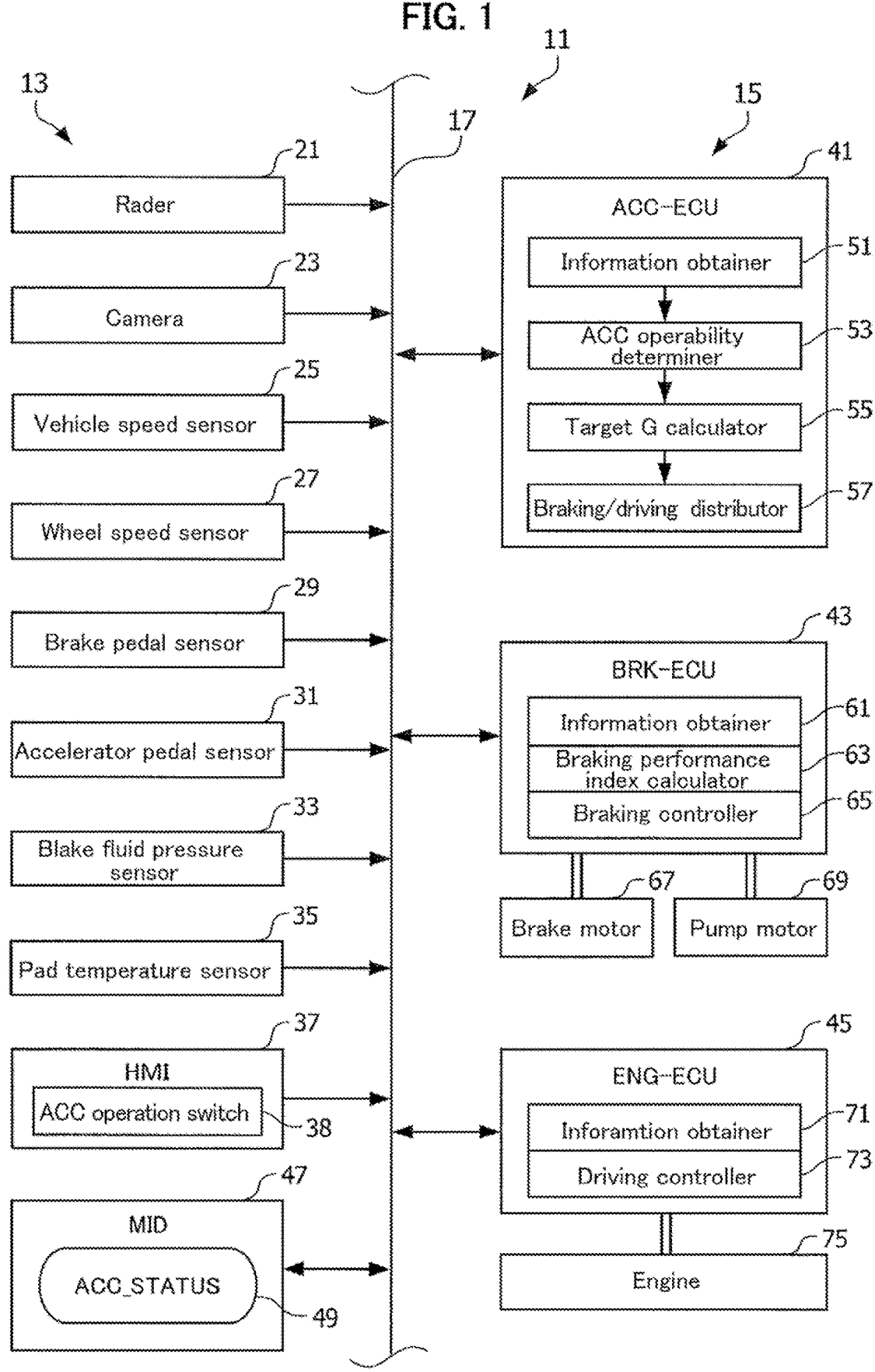
FIG. 1 is a block diagram showing an overview of a traveling control apparatus according to an embodiment of the present invention.

Hereinafter, a traveling control apparatus according to an embodiment of the present invention is described in detail with reference to the drawings as required. Note that members having common functions or members having mutually corresponding functions in the drawings to be shown below shall be denoted, in principle, by common reference numerals. Besides, each member may be deformed or exaggerated in size and shape so as to be schematically represented for the purpose of illustration.

[Overview of Traveling Control Apparatus 11 According to Embodiment]

First, an overview of a traveling control apparatus 11 according to the embodiment of the present invention is described with reference to FIG. 1. FIG. 1 is a block diagram showing an overview of the traveling control apparatus 11 according to the embodiment of the present invention.

The traveling control apparatus 11 of the embodiment of the present invention has a function of preventing a situation of a driver feeling uncomfortable, when adaptive cruise control (ACC) is deactivated and the traveling control is given from the traveling control apparatus 11 back to the driver, due to a sudden change in the sensation of braking resulting from a change in braking performance.

In order to implement the above function, the traveling control apparatus 11 of the embodiment of the present invention is configured to have an input system component 13 connected with an output system component 15 via a communication medium 17, such as a CAN (Controller Area Network), so as to be capable of communicating data with each other, as shown in FIG. 1.

The input system component 13 includes a radar 21, a camera 23, a vehicle speed sensor 25, a wheel speed sensor 27, a brake pedal sensor 29, an accelerator pedal sensor 31, a brake fluid pressure sensor 33, and an MMI (Man-Machine Interface) 37, as shown in FIG. 1.

On the other hand, the output system component 15 includes an ACC-ECU 41, a BRK-ECU 43, an ENG-ECU 45, and an MID (Multi Information Display) 47, as shown in FIG. 1.

The radar 21 has a function of irradiating a target, inclusive of another vehicle traveling ahead of the host vehicle, with a radar wave, and then receiving a radar wave reflected by the target to obtain spread information on the target, inclusive of the distance to, and the direction of, the target from the host vehicle.

The radar 21 includes one or more of a laser radar, a microwave radar, a millimeter wave radar, and an ultrasonic radar, as required. The radar 21 is provided on the back side of a front grill of the host vehicle. The spread information on the target by the radar 21 is sent to the ACC-ECU 41 via the communication medium 17.

The camera 23 has an optical axis inclined obliquely downward in front of the host vehicle, and has a function of capturing an image of a scene in the traveling direction of the host vehicle. The camera 23 includes one or more of a complementary metal oxide semiconductor (CMOS) camera and a charge coupled device (CCD) camera, as required. The camera 23 is provided at the upper center of a windshield (not shown) of the host vehicle or the like. Information on the image of a scene in the traveling direction of the host vehicle captured by the camera 23 is sent, as an image signal generated through an interlace technique such as an NTSC (National Television Standards Committee) standard, to the ACC-ECU 41 via the communication medium 17.

The vehicle speed sensor 25 has a function of detecting a traveling speed of the vehicle (vehicle speed) V. Information on the vehicle speed V detected by the vehicle speed sensor 25 is sent to the BRK-ECU 43 and the like via the communication medium 17.

The wheel speed sensor 27 has a function of detecting a rotational speed (wheel speed) of each wheel (not shown) provided in the host vehicle. Information on the wheel speed for every wheel detected by the wheel speed sensor 27 is sent to the BRK-ECU 43 and the like via the communication medium 17.

The brake pedal sensor 29 has a function of detecting a stepped amount of a brake pedal (not shown) by a driver and a step torque. Information on the brake operation detected by the brake pedal sensor 29, with respect to the stepped amount of the brake pedal and the step torque, is sent to the BRK-ECU 43 and the like via the communication medium 17.

The accelerator pedal sensor 31 has a function of detecting a stepped amount of an accelerator pedal (not shown) by the driver. Information on acceleration and deceleration operation detected by the accelerator pedal sensor 31, with respect to the stepped amount of the accelerator pedal, is sent to the ENG-ECU 45 and the like via the communication medium 17.

The brake fluid pressure sensor 33 has a function of detecting brake fluid pressure in a fluid supply path of a VSA device (Vehicle Stability Assist device, where "VSA" is a registered trademark of the present Applicant), not shown, of a brake fluid pressure system. Information on fluid pressure in the fluid supply path of the VSA device detected by the brake fluid pressure sensor 33 is sent to the BRK-ECU 43 and the like via the communication medium 17.

A pad temperature sensor 35 is provided near a brake pad (not shown) and has a function of detecting a pad temperature Tpd, caused by friction braking, of the brake pad. The pad temperature Tpd has a correlation with braking performance of the host vehicle. Therefore, in the case where the pad temperature Tpd exceeds an appropriate limit temperature, the braking performance of the host vehicle is decreased to a level out of an appropriate range. Information on the pad temperature Tpd (braking state information) detected by the pad temperature sensor 35 is sent to the BRK-ECU 43 and the like via the communication medium 17.

The HMI (Human-Machine Interface) 37 includes an adaptive cruise control (ACC) operation switch (hereinafter referred to as an "ACC operation switch") 38 (see FIG. 1). The ACC operation switch 38 is used when setup information for the ACC is manually inputted. The setup information for the ACC inputted by the ACC operation switch 38 is sent to the ACC-ECU 41 and the like via the communication medium 17.

Figure 2A:
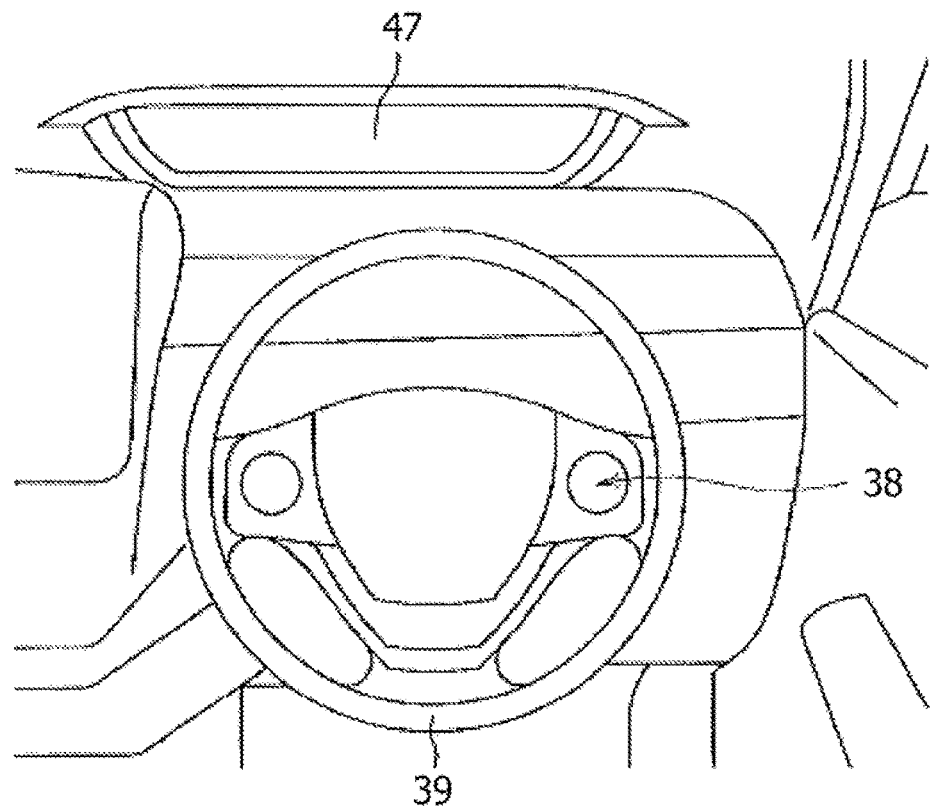
FIG. 2A is an external view of an operation switch, provided in a steering wheel, for adaptive cruise control (ACC)
Figure 2B:
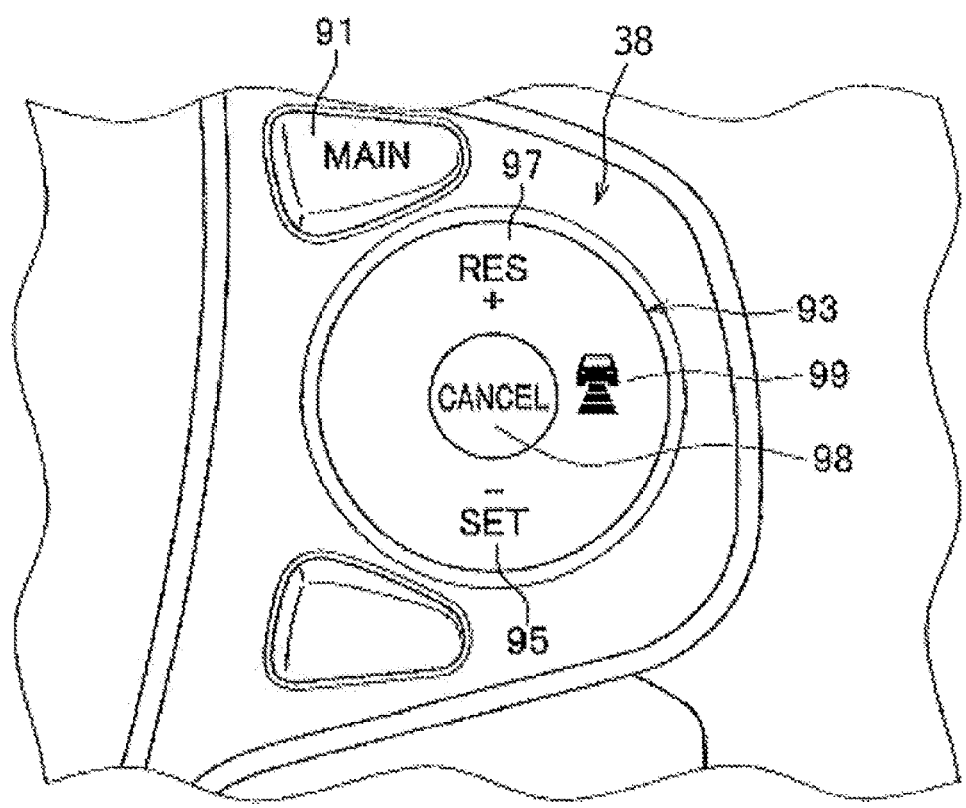
FIG. 2B is an enlarged external view of an operation switch for adaptive cruise control (ACC)

Here, a configuration peripheral to the ACC operation switch 38 is described with reference to FIGS. 2A and 2B. FIG. 2A is an external view of the ACC operation switch 38, provided in the steering wheel 39, for adaptive cruise control (ACC). FIG. 2B is an enlarged external view of the ACC operation switch 38.

The ACC operation switch 38 is provided such as in the steering wheel 39, as shown in FIG. 2A. The multi information display (MID) 47 is provided around an extension of a line of sight, frontward in the traveling direction, of the driver for displaying setup information (ACC_STATUS 49; see FIG. 1) for the ACC in addition to the vehicle speed and the shift position.

Next, the adaptive cruise control (ACC) is described. The ACC is a function of executing traveling control of the host vehicle, when a predetermined follow-up control condition is fulfilled, so as to follow another vehicle traveling ahead of the host vehicle (leading vehicle). A conventional cruise control, on the condition that the required vehicle speed V is set in advance, causes the host vehicle to travel with the vehicle speed V kept at the setup vehicle speed.

In contrast, in addition to the function of keeping the vehicle speed V of the host vehicle at the setup vehicle speed, the adaptive cruise control (ACC), on the condition that a required inter-vehicle distance is set in advance, causes the host vehicle to travel in a state of the vehicle speed V of the host vehicle being maintained within a setup range of the vehicle speed, so as to follow another vehicle traveling ahead of the host vehicle (leading vehicle) while keeping an inter-vehicle distance from the leading vehicle at the setup inter-vehicle distance.

In order to have setup information for the ACC manually inputted, the ACC operation switch 38 includes a main (MAIN) switch 91 and a circular menu switch 93, as shown in FIG. 2B. The main switch 91 is a switch to be operated when the ACC is activated. The circular menu switch 93 is a switch to be operated when setup information for the ACC is manually inputted.

The circular menu switch 93 includes a set (−SET) switch 95, a resume (RES+) switch 97, a cancel (CANCEL) switch 98, and a distance switch 99, as shown in FIG. 2B.

The set (−SET) switch 95 is a switch to be operated when the ACC is set and when the setup vehicle speed is adjusted downward, with respect to setup information for the ACC.

The resume (RES+) switch 97 is a switch to be operated when the ACC is reset and when the setup vehicle speed is adjusted upward, with respect to setup information for the ACC.

The cancel (CANCEL) switch 98 is a switch to be operated when the ACC is to be deactivated. Note that pressing the main switch 91 downward can also deactivate the ACC.

The distance switch 99 is a switch to be operated when the inter-vehicle distance between the host vehicle and the leading vehicle is set up. Setup information on the inter-vehicle distance is sequentially switched such as between four levels ("longest" to "long" to "middle" to "short"), every time the distance switch 99 is pressed downward. Note that the setup values for the inter-vehicle distance are configured to vary depending on the level of the vehicle speed V of the host vehicle so that the setup values for the inter-vehicle distance become shorter as the vehicle speed V becomes lower.

Now, returning back to FIG. 1, a description about the traveling control apparatus 11 is continued. The ACC-ECU 41 belonging to the output system component 15 includes an information obtainer 51, an ACC operability determiner 53, a target G calculator 55, and a braking/driving distributor 57, as shown in FIG. 1. The ACC-ECU 41 executes adaptive cruise control (ACC, corresponding to the term "traveling control" in appended claims) including constant speed traveling control to cause the host vehicle to travel at a constant speed based on a preset vehicle speed V, and follow-up traveling control to cause the host vehicle to travel so as to follow another vehicle traveling ahead of the host vehicle at a predetermined inter-vehicle distance.

In other words, the ACC-ECU 41 executes adaptive cruise control (ACC or traveling control) of the host vehicle including acceleration control and deceleration control, without requiring a driver stepping on an accelerator pedal (not shown) or a brake pedal (not shown), in a state that the vehicle speed V of the host vehicle is maintained within a range of the setup vehicle speed and an inter-vehicle distance from the leading vehicle is kept at the setup inter-vehicle distance.

In addition, the ACC-ECU 41 deactivates the ACC at a time when a braking performance index, derived from the braking state information obtained while the ACC being in operation, is deemed to be decreased by more than a predetermined variation range, as compared with the braking performance index at the time of the ACC having been activated. Here, the wording "while the ACC being in operation" refers to a state where the adaptive cruise control is under execution. The braking state information refers to information to indicate a braking state including the braking performance (available braking force) of the host vehicle.

Other than the pad temperature Tpd, such as an integrated value of the brake fluid pressure, or a vehicle speed difference before and after deceleration may suitably be adopted as the braking state information. The braking performance index is information to give a scale for evaluating the braking performance (available braking force) possessed by the host vehicle. The braking performance index derived from the braking state information refers to a braking performance index obtained by applying a conversion table to the braking state information (pad temperature Tpd, for example). This prevents a situation of the driver feeling uncomfortable, when the ACC is deactivated and the traveling control is given from the traveling control apparatus 11 back to the driver, due to a sudden change in the sensation of braking resulting from a change in braking performance. Details of this function is to be described below in Cases 1 to 5.

The ACC-ECU 41 is configured with a microcomputer including a CPU (Central Processing Unit), a ROM (Read Only Memory), and a RAM (Random Access Memory). This microcomputer retrieves and executes programs and data stored in the ROM, for operation to control executing various functions provided by the ACC-ECU 41, including a function of obtaining various types of information, a function of determining ACC operability of the ACC, a function of calculating the target G, and a function of distributing braking/driving. The ACC-ECU 41 corresponds to a part of the "traveling controller" of the present invention.

The information obtainer 51 has a function of obtaining various types of information including spread information of the target obtained by the radar 21, image information of a scene in the traveling direction of the host vehicle captured by the camera 23, information on the vehicle speed V detected by the vehicle speed sensor 25, Information on the braking performance index obtained by a braking performance index calculator 63 of the BRK-ECU 43, to be described below, and setup information on the ACC inputted via the ACC operation switch 38 belonging to the MMI (Man-Machine Interface) 37.

The ACC operability determiner 53 has a function of making a determination on ACC operability (whether or not to permit the ACC to be activated) based on information on the braking performance index obtained by the information obtainer 51 via the BRK-ECU 43. The determination about whether or not the ACC is to be activated is described below in detail in Cases 1 to 5.

The target G calculator 55 has a function of calculating target acceleration/deceleration (target G) based on the spread information of the target obtained by the information obtainer 51, the image information of a scene in the traveling direction of the host vehicle, the information on the vehicle speed V, the setup information on the ACC, and the like.

The braking/driving distributer 57 has a function of calculating a distribution ratio on braking and driving based on the information on the vehicle speed V, the information on the target G calculated by the target G calculator 55, and the like, and then executing torque distribution on braking and driving according to the calculated distribution ratio.

The BRK-ECU 43 belongs to the output system component 15 as with the ACC-ECU 41. The BRK-ECU 43 includes an information obtainer 61, the braking performance index calculator 63, and a braking controller 65, as shown in FIG. 1.

The BRK-ECU 43 has a function of activating a motor cylinder device (not shown: see Japanese Patent Application Publication No. 2015-110378, for example) driven by a brake motor 67, depending on the level of a brake fluid pressure (primary fluid pressure) generated in a master cylinder (not shown) by a driver's braking operation, to generate a brake fluid pressure (secondary fluid pressure) for braking the host vehicle.

The BRK-ECU 43 also has a function of driving a pressure pump (not shown) using a pump motor 69, in response to a deceleration control command sent from the braking/driving distributor 57, for example, to control the braking forces of the four wheels so as to each have a braking force based on the target fluid pressure for each wheel.

The master cylinder, the motor cylinder device, the brake motor 67, and the pump motor 69 correspond to a "braking device" of the present invention.

The BRK-ECU 43 is composed of a microcomputer including a CPU (Central Processing Unit), ROM (Read Only Memory), and RAM (Random Access Memory). The microcomputer retrieves and executes programs and data stored in the ROM, to control executing various functions of the BRK-ECU 43 inclusive of obtaining various types of information, calculating a braking performance index, and controlling braking based on braking operation or ACC operation. The BRK-ECU 43 corresponds to a part of the "braking device" and "traveling controller" of the present invention.

The information obtainer 61 has a function of obtaining various kinds of information including information on the vehicle speed V detected by the vehicle speed sensor 25, information on the wheel speed for each wheel detected by the wheel speed sensor 27, braking operation information on a stepped amount of the brake pedal and a step torque detected by the brake pedal sensor 29, information on fluid pressure in the fluid supply path of the VSA device detected by the brake fluid pressure sensor 33, and braking control information sent from the braking/driving distributor 57 of the ACC-ECU 41.

The braking performance index calculator 63 uses the (measured value of) pad temperature Tpd detected by the pad temperature sensor 35 as the braking state information, to execute calculation of converting the pad temperature Tpd into a braking performance index, with reference to the conversion table. Incidentally, there is a negative linear correlation between the pad temperature Tpd and the braking performance index. That is, the higher the pad temperature Tpd is, the lower the braking performance index is. Note that the braking performance index is not particularly limited, and as an example, the braking performance index calculator 63 may be configured to estimate the pad temperature Tpd through calculation based on information on the vehicle speed V and information on fluid pressure in the fluid supply path of the VSA device, and then to convert the estimated pad temperature Tpd into a braking performance index.

The braking controller 65 activates the motor cylinder device driven by the braking motor 67, based on the information on the braking operation by the driver obtained via the brake pedal sensor 29 or the braking control information sent from the braking/driving distributor 57 of the ACC-ECU 41, to execute braking control of the host vehicle, and drives the pressure pump using the pump motor 69, as required, to control the braking forces of the four wheels to those based on the target fluid pressures for the respective wheels.

The ENG-ECU 45 belongs to the output system component 15 as with the ACC-ECU 41 and the BRK-ECU 43. The ENG-ECU 45 includes an information obtainer 71 and a driving controller 73, as shown in FIG. 1.

The ENG-ECU 45 has a function of executing driving control of an internal combustion engine 75, based on the information on the acceleration operation (stepped amount of the accelerator pedal) by the driver obtained via the accelerator pedal sensor 31 or the driving control information sent from the braking/driving distributor 57 of the ACC-ECU 41.

More specifically, the ENG-ECU 45 controls a throttle valve (not shown) to adjust the intake air amount to the internal combustion engine 75, an injector (not shown) to inject fuel gas, an ignition plug (not shown) to ignite fuel, and the like, for driving control of the internal combustion engine 75.

The ENG-ECU 45 is composed of a microcomputer including a CPU (Central Processing Unit), ROM (Read Only Memory), and RAM (Random Access Memory). The microcomputer retrieves and executes programs and data stored in the ROM, to control executing various functions of the ENG-ECU 45 inclusive of obtaining various types of information and controlling driving of the internal combustion engine 75. The ENG-ECU 45 corresponds to a part of the "traveling controller" of the present invention.

The information obtainer 71 has a function of obtaining various types of information including information on acceleration/deceleration operation based on the stepped amount of the accelerator pedal detected by the accelerator pedal sensor 31, and driving control information sent from the braking/driving distributor 57 of the ACC-ECU 41.

The driving controller 73 executes driving control of the internal combustion engine 75, based on information on the acceleration operation (stepped amount of the accelerator pedal) by the driver obtained via the accelerator pedal sensor 31, or driving control information sent from the braking/driving distributor 57 of the ACC-ECU 41.

[Operation of Traveling Control Apparatus 11]

Figure 3:
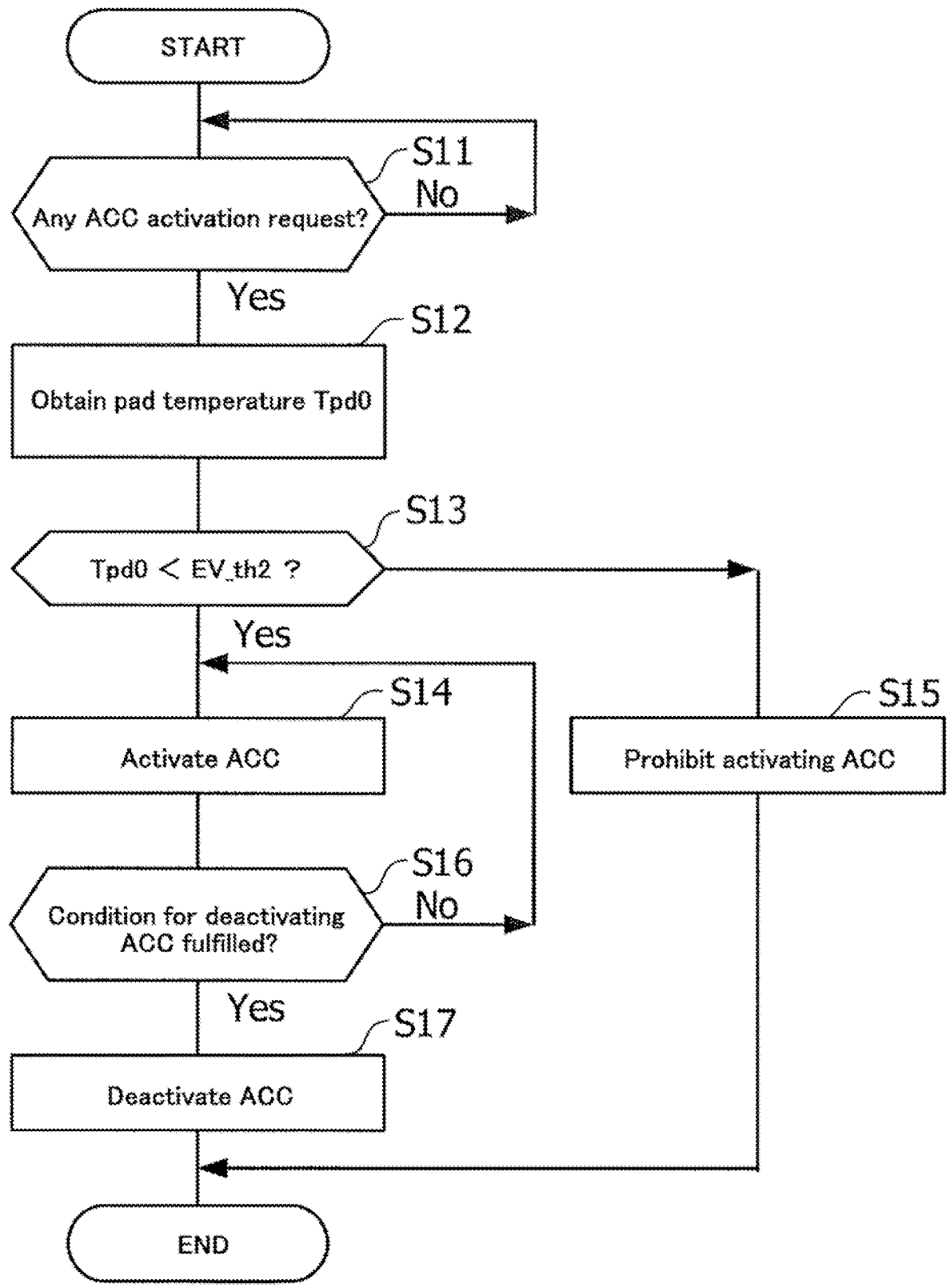
FIG. 3 is a flowchart to be used for describing operation of the traveling control apparatus according to the embodiment of the present invention.

Next, a description is given of operation of the traveling control apparatus 11 according to the embodiment of the present invention, with reference to FIG. 3. FIG. 3 is a flowchart to be used for describing the operation of the traveling control apparatus 11 according to the embodiment of the present invention.

In step S11 in FIG. 3, the ACC-ECU 41 determines whether or not there is an ACC activation request. Here, the determination whether or not there is an ACC activation request is made through whether or not a predetermined condition for permitting an activation request is fulfilled. The predetermined condition for permitting an activation request may adopt a condition, for example, that the main switch 91 of the ACC operation switch 38 is turned on, and information on the ACC (vehicle speed V and inter-vehicle distance from the leading vehicle) is set.

If it is determined that there is no ACC activation request (No in step S11) as a result of the determination in step S11, the ACC-ECU 41 repeats processing in step S11 until it is determined that there is an ACC activation request. In contrast, if it is determined that there is an ACC activation request (Yes in step S11) as a result of the determination in step S11, the ACC-ECU 41 advances the process flow to the next step S12.

In step S12, the information obtainer 51 of the ACC-ECU 41 obtains information on a pad temperature Tpd0 at a time when the determination is made that the ACC activation is requested, in order to obtain a braking performance index at the time. The ACC-ECU 41 converts the obtained pad temperature Tpd0 into a braking performance index.

In step S13, the ACC operability determiner 53 of the ACC-ECU 41 determines whether or not the braking performance index derived from the temperature Tpd0 is less than a second evaluation threshold EV_th2, which is a threshold value used as a guideline for evaluating the braking performance index, and is set to prevent a situation of the driver feeling uncomfortable with the braking operation, at a time of braking operation immediately after the ACC has been canceled while in operation, due to a change in braking performance. In the case where the braking performance index derived from the pad temperature Tpd0 is less than the second evaluation threshold EV_th2, such a situation is prevented that the driver feels uncomfortable with the braking operation, at a time of braking operation immediately after the ACC has been canceled while in operation, due to a change in braking performance.

If it is determined in step S13 that the braking performance index derived from the pad temperature Tpd0 is less than the second evaluation threshold EV_th2 (Yes in step S13), the ACC-ECU 41 advances the process flow to the next step S14. In contrast, if it is determined that the braking performance index derived from the pad temperature Tpd0 is equal to or higher than the second evaluation threshold EV_th2 (No in step S13) as a result of the determination in step S11, the ACC-ECU 41 makes the process flow jump to step S15.

In step S14, the ACC-ECU 41 controls activating the ACC according to the preset vehicle speed and inter-vehicle distance.

In contrast, the ACC-ECU 41 controls prohibiting ACC activation in step S15. This prohibits the ACC from being activated. Then, the ACC-ECU 41 ends the series of processing flow.

In step S16, the ACC-ECU 41 determines whether or not a condition for deactivating the ACC is fulfilled, after the ACC has been activated. The condition for deactivating the ACC is a condition set in advance to deactivate the ACC. The condition for deactivating the ACC is suitably set in consideration of preventing a situation of the driver feeling uncomfortable, when the ACC (traveling control) is deactivated and the traveling control is given from the traveling control apparatus 11 back to the driver, due to a sudden change in the sensation of braking resulting from a change in braking performance.

Figure 4:
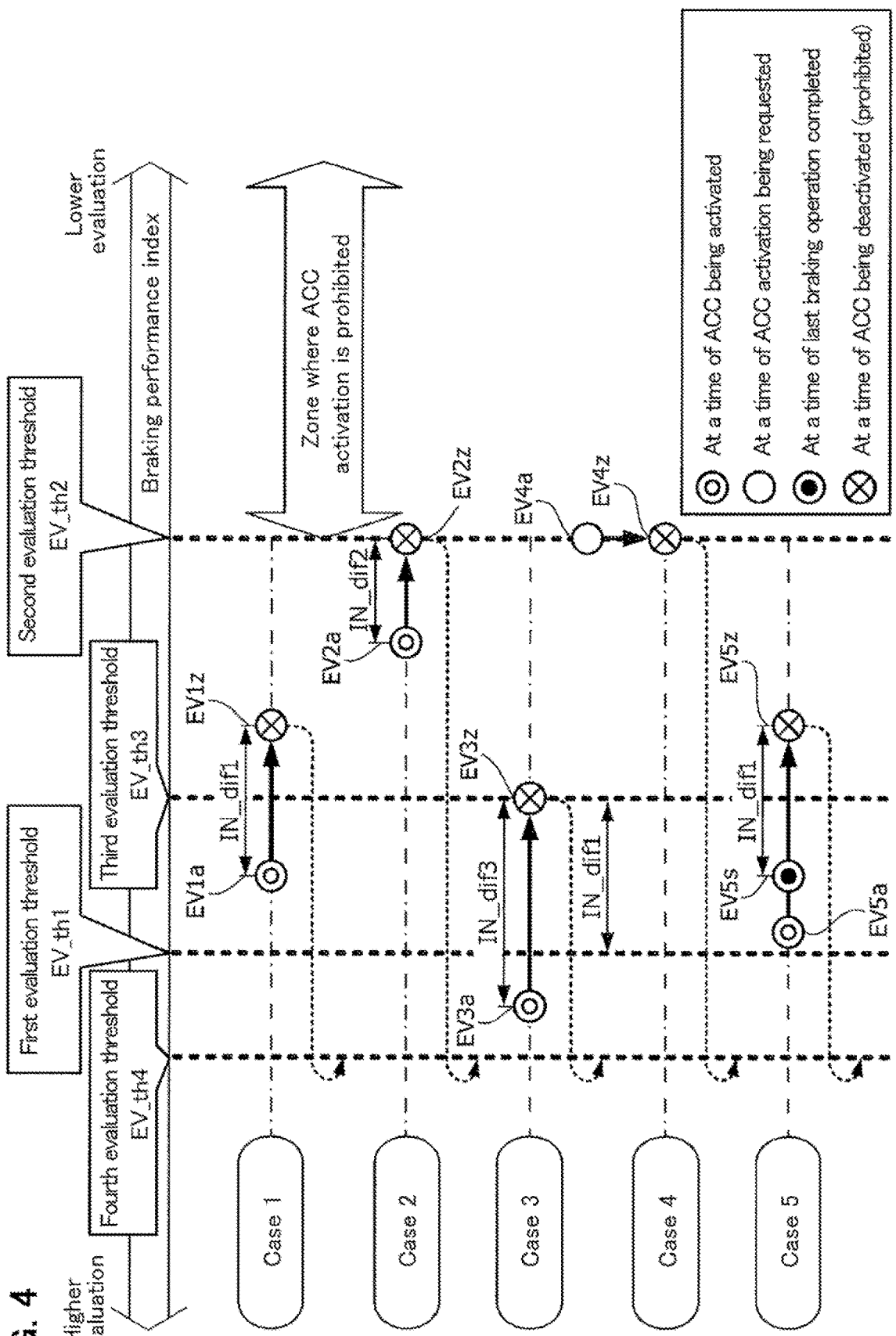
FIG. 4 is a diagram to be used for describing operation of the traveling control apparatus in Cases 1 to 5.

A condition for deactivating the ACC may suitably adopt a condition, for example, that the braking performance index, derived from the braking state information (such as the pad temperature Tpd) obtained while the ACC being in operation, is decreased by more than a first variation width IN_dif1 (see Case 1 in FIG. 4), as compared with the braking performance index at the time of the ACC having been activated, or the braking performance index derived from the braking state information obtained while the ACC being in operation becomes equal to or less than the second evaluation threshold EV_th2 (see FIG. 4). Details of the conditions for deactivating the ACC are to be described below in Cases 1 to 5.

If it is determined as a result of the determination in step S16 that the condition for deactivating the ACC is not fulfilled (No in step S16), the ACC-ECU 41 returns the process flow to step S14, and executes the processing in and after step S14. In contrast, if it is determined as a result of the determination in step S16 that the condition for deactivating the ACC is fulfilled (Yes in step S16), the ACC-ECU 41 advances the process flow to the next step S17.

In step S17, the ACC-ECU 41 controls deactivating the ACC. This causes the ACC to be deactivated. The ACC-ECU 41 then ends the series of processing flow. [Operation of Traveling Control Apparatus 11 in Cases 1 to 5]

Next, a description is given of operation of the traveling control apparatus 11 in Cases 1 to 5, with reference to FIG. 4. FIG. 4 is a diagram to be used for describing the operation of the traveling control apparatus 11 in Cases 1 to 5. In FIG. 4, the horizontal axis represents the braking performance index. The level of the braking performance index increases leftward (higher evaluation), while decreases rightward (lower evaluation). In FIG. 4, the vertical axis represents respective operation in Cases 1 to 5.

The horizontal axis in FIG. 4, representing the braking performance index, has four evaluation thresholds (first to fourth) EV_th1, EV_th2, EV_th3, and EV_th4 set thereon, as guidelines for evaluating the braking performance index. The first to fourth evaluation thresholds EV_th1, EV_th2, EV_th3, and EV_th4 have a relationship such that the smaller value is more superior (higher evaluation) in terms of braking performance.

The first evaluation threshold EV_th1 is an evaluation threshold serving as a reference when the braking performance index is evaluated. The first evaluation threshold EV_th1 is set to have a standard value among the braking performance indexes.

The second evaluation threshold EV_th2 is an evaluation threshold set to prevent a situation of the driver feeling uncomfortable with the braking operation, at a time of braking operation immediately after the ACC has been canceled, due to a change in braking performance. The second evaluation threshold EV_th2 is set to a lower evaluation value than the first evaluation threshold EV_th1 in terms of braking performance (EV_th1>EV_th2), as shown in FIG. 4.

Note that a zone having a braking performance index evaluated lower than the second evaluation threshold EV_th2 is set as a zone where ACC activation is prohibited. That is, the second evaluation threshold EV_th2 defines a critical value of the braking performance index in a normal range of the driver not feeling uncomfortable with the braking operation, at a time of braking operation immediately after the ACC has been canceled, due to a change in braking performance. Incidentally, the braking performance index in the normal range has the critical value (second evaluation threshold EV_th2) set only for lower evaluation, and no critical value is set for higher evaluation.

The third evaluation threshold EV_th3 is an evaluation threshold value positioned as an intermediate value of the braking performance indexes in the normal range. The third evaluation threshold EV_th3 is set to have an intermediate value evaluated as a medium level (lower evaluation than the standard value but higher evaluation than the critical value) in terms of braking performance, as compared with the first evaluation threshold EV_th1 and the second evaluation threshold EV_th2 (EV_th1>EV_th3>EV_th2), as shown in FIG. 4.

The fourth evaluation threshold EV_th4 is an evaluation threshold set to prevent burning smell caused by smoking/heating at the brake pad. As shown in FIG. 4, the fourth evaluation threshold EV_th4 is set to have a value superior to (evaluated higher than) the first evaluation threshold EV_th1, the second evaluation threshold EV_th2, and the third evaluation threshold EV_th3 in terms of braking performance (EV_th4>EV_th1>EV_th3>EV_th2). Burning smell caused by smoking/heating at the brake pad is prevented in a zone having higher evaluation values than the fourth evaluation threshold EV_th4.

<Operation of Traveling Control Apparatus 11 in Case 1>

A description is given of operation of the traveling control apparatus 11 in Case 1, with reference to FIG. 4. In the traveling control apparatus 11 in Case 1, the ACC-ECU (traveling controller) 41 deactivates the ACC at a time when a braking performance index EV1z, derived from the braking state information obtained by the information obtainer 51 while the ACC (traveling control) being in operation, is deemed to be decreased by more than the predetermined first variation width IN_dif1, as compared with a braking performance index EV1a at the time of the ACC having been activated.

The predetermined first variation width IN_dif1 is set to have a suitable value in consideration of preventing a situation of the driver feeling uncomfortable with the braking operation, when the braking control is given back to the driver (when the driver executes the first braking operation after the ACC has been deactivated) because of a fall in the braking performance evaluation, due to a change in braking performance, and extending a time of the ACC being in operation as much as possible.

In addition, the time when the braking performance index EV1z, derived from the braking state information obtained while the ACC being in operation, is deemed to be decreased by more than the predetermined first variation width IN_dif1, as compared with the braking performance index EV1a at the time of the ACC having been activated, is a concept including both a time when the index EV1z is estimated to be decreased and a time when the index EV1z actually decreases (the same holds true hereinbelow). In the first place, the braking performance (index) of the host vehicle changes from moment to moment depending on a rapid pace of change in the driving scene. It is thus difficult to accurately obtain the current state of braking performance (index). Accordingly, it is appropriate to handle the current state of the braking performance (index) of the host vehicle, while allowing a certain amount of error.

In short, "the time when the braking performance index EV1z, derived from the braking state information obtained while the ACC being in operation, is deemed to be decreased by more than the predetermined first vaiation width IN_dif1, as compared with the braking performance index EV1a at the time of the ACC having been activated" is adopted, in light of the fact that the current state of braking performance (index) is better to be treated so as to allow a certain amount of error, as a moderate expression in accordance with this fact.

Further, "the ACC is deactivated at a time when the braking performance index EV1z, derived from the braking state information obtained while the ACC being in operation, is deemed to be decreased by more than the predetermined first variation width IN_dif1, as compared with the braking performance index EV1a at the time of the ACC having been activated," and therefore the ACC is not deactivated in a case where the brake performance index EV1z increases (transitions toward a direction having higher evaluation values) as compared with the braking performance index EV1a at the time of the ACC having been activated, or in a case where the brake performance index EV1z decreases within a range not exceeding the first variation width IN_dif1. This is because it is considered that there can be no situation, in such cases, of the driver feeling uncomfortable, when the driving control is given back to the driver because of the ACC being deactivated, due to a sudden change in the sensation of braking operation resulting from a change in braking performance.

Note that the braking performance index EV1a in Case 1 at the time of the ACC having been activated is located on a side having lower evaluation values (right side of the braking performance index in FIG. 4) than the first evaluation threshold EV_th1. In such a case (EV1a<EV_th1: comparison between the braking performance indexes), the ACC-ECU (traveling controller) 41 in Case 1, in principle (exceptions are disclosed in Cases 1, 4, and 5), deactivates the ACC at a time when the braking performance index EV1z, derived from the braking state information obtained by the information obtainer 51 while the ACC being in operation, is deemed to be decreased by more than the first variation width IN_dif1, as compared with the braking performance index EV1a at the time of the ACC having been activated.

According to the traveling control apparatus 11 in Case 1, there can be no situation of having a sudden change in the sensation of braking between the time when the ACC has been activated and the time when the ACC is deactivated, as far as a value in consideration of securing stability of the traveling control operation is suitably set as the first variation width IN_dif1. As a result, such a situation is prevented that the driver feels uncomfortable, when the driving control is given back to the driver because of the ACC being deactivated (based on a decrease of the braking performance index), due to a sudden change in the sensation of braking resulting from a change in braking performance.

Additionally in the traveling control apparatus 11 in Case 1, when the braking performance index EV1a at the time of the ACC having been activated is lower than the first evaluation threshold EV_th1 serving as a reference for evaluating the braking performance index, the ACC-ECU 41 deactivates the ACC at a time when the braking performance index EV1z, derived from the braking state information obtained by the information obtainer 51 while the ACC being in operation, is deemed to be decreased by more than the first variation width IN_dif1, as compared with the braking performance index EV1a at the time of the ACC having been activated. Note that operation of the traveling control apparatus 11 when the braking performance index EV1a at the time of the ACC having been activated is evaluated to be higher than the first evaluation threshold EV_th1 (standard braking performance index) is described in Case 3. The traveling control apparatus 11 in Case 1 has a definition range specifically defined, in which the braking performance index EV1a at the time the ACC having been activated falls, as one of the conditions of deactivating the ACC, to have advantageous effects that the traveling control apparatus 11 is accurately operated.

<Operation of Traveling Control Apparatus 11 in Case 2>

Next, a description is given of operation of the traveling control apparatus 11 in Case 2, with reference to FIG. 4. In the traveling control apparatus 11 in Case 2, even when the braking performance index EV2z, derived from the braking state information obtained by the information obtainer 51 while the ACC being in operation, is not decreased by more than the first variation width IN_dif1, as compared with a braking performance index EV2a at the time of the ACC having been activated (a second variation width IN_dif2 in this case is smaller than the first variation width IN_dif1, that is, IN_dif2<IN_dif1), the ACC-ECU (traveling controller) 41 deactivates the ACC at a time when a braking performance index EV2z, derived from the braking state information while the ACC being in operation, is deemed to be decreased to a value less than or equal to the second evaluation threshold EV_th2, which is lower than the first evaluation threshold EV_th1.

The traveling control apparatus 11 in Case 2 assumes a case where the braking performance index EV2a at the time of the ACC having been activated has a lower evaluation value than the third evaluation threshold EV_th3, and is located close to the second evaluation threshold EV_th2. In Case 2 (where EV_th3>EV2a>EV_th2, and |EV_th2−EV2a|=IN_dif2<IN_dif1), the ACC is deactivated at a time when the braking performance index EV2z, derived from the braking state information while the ACC being in operation, is deemed to be decreased to a value less than or equal to the second evaluation threshold EV_th2 (that is, at a time when it is determined that the driver may feel uncomfortable with braking operation, at a time of braking operation immediately after the ACC has been canceled while in operation, due to a change in braking performance).

When the braking performance index EV2z, derived from the braking state information while the ACC being in operation, is evaluated to be lower than the second evaluation threshold EV_th2 (resulting in a risk of the driver feeling uncomfortable with the braking operation, at a time of braking operation immediately after the ACC has been canceled while in operation, due to a change in braking performance), the traveling control apparatus 11 in Case 2 relaxes conditions for deactivating the ACC, for potential effect of the ACC being deactivated in a timely manner. Note that the traveling control apparatus 11 in Case 2 is premised on that in Case 1 and is implemented in combination with that in Case 1.

<Operation of Traveling Control Apparatus 11 in Case 3>

Next, a description is given of operation of the traveling control apparatus 11 in Case 3, with reference to FIG. 4. The traveling control apparatus 11 in Case 3 is considered to be a modification of the traveling control apparatus 11 in Case 1. In the traveling control apparatus 11 in Case 3, when a braking performance index EV3a at the time of the ACC having been activated is evaluated to be higher than the first evaluation threshold EV_th1, the ACC-ECU (traveling controller) 41 deactivates the ACC at a time when a braking performance index EV3z, derived from the braking state information obtained by the information obtainer 51 while the ACC being in operation, is deemed to be decreased to a value Iss than or equal to the third evaluation threshold EV_th3, which is lower than the first evaluation threshold EV_th1 by the first variation width IN_dif1.

The traveling control apparatus 11 in Case 3 assumes a case where the braking performance index EV3a at the time of the ACC having been activated is evaluated to be higher than the first evaluation threshold EV_th1 (standard braking performance index), which is set to a standard value of the braking performance indexes.

In Case 3 (EV3a>EV_th1), the ACC is deactivated at a time when the braking performance index EV3z, derived from the braking state information while the ACC being in operation, is deemed to be decreased to a value less than or equal to the third evaluation threshold EV_th3 (at a time determined as being evaluated to be in a mid-level in terms of the braking performance).

With the traveling control apparatus 11 in Case 3, the third variation width IN_dif3 until the condition for canceling operation being fulfilled is made greater than the first variation width IN_dif1 (IN_dif3>IN_dif1), to allow for making a time until the condition for canceling operation being fulfilled longer as compared with Case 1 or Case 2, for potential effect of extending the time of the ACC being stably operated.

<Operation of Traveling Control Apparatus 11 in Case 4>

Next, a description is given of operation of the traveling control apparatus 11 in Case 4, with reference to FIG. 4. In the traveling control apparatus 11 in Case 4, the ACC-ECU (traveling controller) 41 prohibits the ACC from being activated, when a braking performance index EV4a, derived from the braking state information obtained by the information obtainer 51, is less than or equal to the second evaluation threshold EV_th2 at the time of activating the ACC being requested.

The traveling control apparatus 11 in Case 4, assumes a case where the braking performance index EV4a at the time of ACC activation having been requested is less than or equal to the second evaluation threshold EV_th2 (to have a risk of the driver feeling uncomfortable with the braking operation, at a time of braking operation immediately after the ACC has been canceled while in operation, due to a change in braking performance).

In Case 4 (EV4a=<EV_th2), when the braking performance index EV4a at the time of ACC activation having been requested is less than or equal to the second evaluation threshold EV_th2, ACC activation is prohibited at the time of ACC activation having been requested, to have a braking performance index EV4z being identical to the braking performance index EV4a, in consideration of a risk of the driver feeling uncomfortable with the braking operation, at a time of braking operation immediately after the ACC has been canceled, due to a change in braking performance, if the ACC activation is permitted to proceed as operated.

The traveling control apparatus 11 in Case 4 allows for preventing a situation of the ACC being repeatedly activated and deactivated in a short period of time. As a result, the ACC operation is stabilized in the sense that the ACC is kept in operation as much as possible. Note that the traveling control apparatus 11 in Case 4 is premised on that in Case 1 and implemented in combination with that in Case 1.

<Operation of Traveling Control Apparatus 11 in Case 5>

Next, a description is given of operation of the traveling control apparatus 11 in Case 5, with reference to FIG. 4. The traveling control apparatus 11 in Case 5 is considered to be a modification of the traveling control apparatus 11 in Case 1. In the traveling control apparatus 11 in Case 5, the ACC-ECU (traveling controller) 41 deactivates the ACC at a time when a braking performance index EV5z, derived from the braking state information obtained by the information obtainer 51 while the ACC (traveling control) being in operation, is deemed to be decreased by more than the first variation width IN_dif1, as compared with a braking performance index EV5s derived from the braking state information at the time when the last braking operation had been completed before the ACC has been activated.

According to the study by the present inventors, when a braking performance index EV5a at the time of the ACC having been activated is compared with the braking performance index EV5s derived from the braking state information at the time when the last braking operation had been completed before the ACC has been activated, the latter braking performance index EV5s is found to more directly express the driver's sensation of braking and be evaluated lower, as compared with the former braking performance index EV5a. In addition, in order to accurately prevent a situation of the driver feeling uncomfortable, when the driving control is given back to the driver, due to a sudden change in the sensation of braking resulting from a change in braking performance, it is preferable that the timing of obtaining the braking performance index correlated with the driver's sensation of braking be made closer to a time when the driver has actually operated braking.

Then, in Case 5 ($EV5s<EV5a$ in comparison of the braking performance indexes), the braking performance index $EV5s$, derived from the braking state information at the time when the last braking operation had been completed before the ACC has been activated, is adopted as a braking performance index serving as a reference when a determination is made on whether or not the ACC needs to be deactivated, in place of the braking performance index $EV5a$ at the time of the ACC having been activated. In the traveling control apparatus 11 in Case 5, the ACC is deactivated at a time when the braking performance index $EV5a$ at the time of the ACC having been activated is deemed to be decreased by more than the first variation width IN_dif1, as compared with the braking performance index $EV5s$ at the time when the last braking operation had been completed before the ACC has been activated.

According to the traveling control apparatus 11 in Case 5, the timing of obtaining the braking performance index correlated with the driver's sensation of braking is made to the time when the last braking operation had been completed (when the driver had actually operated braking) before the ACC has been activated, in place of the time when the ACC in Case 1 has been activated, to further improve the effect of preventing the driver from feeling uncomfortable, due to a sudden change in the sensation of braking resulting from a change in braking performance, as compared with the traveling control apparatus 11 in Case 1.

<Operation Common to Traveling Control Apparatus 11 in Cases 1 to 5>

Next, a description is given of operation common to the traveling control apparatus 11 in Cases 1 to 5, with reference to FIG. 4 as required.

In Cases 1 to 5, activating the ACC is prohibited after the ACC has been deactivated, as shown in FIG. 4, until the braking performance index, derived from the braking state information obtained by the information obtainer 51, is evaluated to be higher than the fourth evaluation threshold EV_th4, which is higher than the first evaluation threshold EV_th1.

The traveling control apparatus 11 in Cases 1 to 5 prevents a situation of the ACC being repeatedly activated and deactivated in a short period of time. As a result, the traveling control operation is stabilized in the sense that the ACC is kept in operation as much as possible.

In the traveling control apparatus 11 in Cases 1 to 5, even when the ACC is controlled to be activated by a passenger of the host vehicle requesting activation, the ACC-ECU (traveling controller) 41 keeps a state of prohibiting the ACC from being activated, while the ACC is prohibited from being activated. Note that "when the ACC is prohibited from being activated" includes, in addition to Case 4 (the braking performance index $EV4a$, at the time of ACC activation having been requested, is evaluated to be low enough so as to be less than or equal to the second evaluation threshold EV_th2), during a time, after the last ACC operation had been deactivated, until the braking performance index at the time of the ACC activation having been requested is evaluated to be higher than the fourth evaluation threshold EV_th4.

The traveling control apparatus 11 in Cases 1 to 5 informs the driver of a braking state of the host vehicle (that the ACC being prohibited from being activated), through keeping a state that the ACC is prohibited from being activated even with a request for normal activation. In addition, the traveling control apparatus 11 in Cases 1 to 5 prevents a situation of the ACC being repeatedly activated and deactivated in a short period of time. As a result, the traveling control operation is stabilized in the sense that the ACC is kept in operation as much as possible.

In the traveling control apparatus 11 in Cases 1 to 5, the ACC-ECU (traveling controller) 41 has traveling control after the ACC has been activated, to execute traveling control including acceleration and deceleration of the host vehicle by the ACC-ECU 41, with or without control by a passenger. Therefore, it is difficult for the driver to know how the host vehicle being braked while the ACC is in operation.

Then, in the traveling control apparatus 11 in Cases 1 to 5, even when the ACC is controlled to be activated by a passenger of the host vehicle requesting activation, the ACC-ECU 41 is configured to deactivate the ACC based on an increase or decrease of the braking performance index, derived from the braking state information obtained by the information obtainer 51, instead of operation by the passenger of the host vehicle.

The traveling control apparatus 11 in Cases 1 to 5, in principle (as an exception, operating the cancel switch 98 or the main switch 91 also deactivates the ACC), deactivates the ACC based on an increase or decrease of the braking performance index, derived from the braking state information obtained by the information obtainer 51, instead of operation by the passenger of the host vehicle, and thus is capable of informing the driver of a braking state of the host vehicle (that the traveling control having been deactivated), through the traveling control having been deactivated. In addition, the traveling control apparatus 11 in Cases 1 to 5 prevents a situation of the ACC being repeatedly activated and deactivated in a short period of time. As a result, the traveling control operation is stabilized in the sense that the ACC is kept in operation as much as possible.

Further, in the traveling control apparatus 11 in Case 1 or 5, the ACC-ECU 41 may be configured to additionally obtain traveling route information of the host vehicle (such as the gradient, the curvature, and the number of corners per unit distance of the traveling route) by the information obtainer 51, and then to change the first variation width IN_dif1 based on the traveling route information obtained by the information obtainer 51.

Specifically, as an example, the traveling control apparatus 11 in Case 1 or 5 may change the first variation width IN_dif1, based on the traveling route information of the host vehicle, so that the variation width is made larger in a road condition with a large braking load, for example.

The traveling control apparatus 11 in Case 1 or 5 changes the first variation width IN_dif1, based on the traveling route information of the host vehicle, so that the variation width is made larger in a road condition with a large braking load, for example, to prevent a situation of the ACC being repeatedly activated and deactivated in a short period of time. As a result, the traveling control operation (ACC operation) is stabilized in the sense that the ACC is kept in operation as much as possible.

Still further, the traveling control apparatus 11 in Cases 1 to 5 may be configured to have the time of the ACC having been activated set to a time when a start operation for activating the ACC is made.

Still further, the traveling control apparatus 11 in Cases 1 to 5 may be configured to have the time of the ACC having been activated set to a time before the start operation for activating the ACC is made.

Still further, the traveling control apparatus 11 in Cases 1 to 5 may be configured to have the time of the ACC having been activated set to a time after the start operation for activating the ACC is made.

Other Embodiments

The embodiment described hereinabove shows examples of implementing the present invention. Accordingly, the technical scope of the present invention should not be limitedly interpreted by these examples. This is because the present invention can be implemented in various forms without departing from the gist or main features thereof.

In the description of the traveling control apparatus 11 according to the embodiment of the present invention, the ACC-ECU (traveling controller) 41 has a function of executing at least one type of traveling control of the constant speed traveling control to cause the host vehicle to travel at a constant speed based on a preset vehicle speed, and the follow-up traveling control to cause the host vehicle to travel so as to follow another vehicle traveling ahead of the host vehicle at a predetermined inter-vehicle distance. That is, the traveling control apparatus of the present invention includes, within a technical scope thereof, all of executing only the constant speed traveling control, executing only the follow-up traveling control, and executing a combination of the constant speed traveling control and the follow-up traveling control.

Additionally, in the description of the traveling control apparatus 11 according to the embodiment of the present invention, an example of a vehicle equipped with the internal combustion engine 75 as a drive means has been described, but the present invention is not limited thereto. The present invention can also be applied to a vehicle equipped with a compression auto-ignition engine (diesel engine) as a driving means, and an electric vehicle EV (Electric Vehicle) including a hybrid vehicle such as a HEV (Hybrid Electric Vehicle).

LEGEND FOR REFERENCE NUMERALS

11: traveling control apparatus, 41: ACC-ECU (traveling controller), 43: BRK-ECU (braking device and a part of traveling controller), 51: information obtainer, EV_th1: first evaluation threshold, EV_th2: second evaluation threshold, EV_th3: third evaluation threshold, EV_th4: fourth evaluation threshold, IN_dif1: first variation width (predetermined variation width), and Tpd: pad temperature (braking state information).

What is claimed is:

1. A traveling control apparatus used for executing traveling control of a host vehicle, the apparatus comprising:
   an information obtainer, as a part of an adaptive cruise control ECU (Electronic Control Unit) in the host vehicle, configured to obtain braking state information of a braking device in the host vehicle; and
   a traveling controller configured to execute at least one type of traveling control of constant speed traveling control to cause the host vehicle to travel at a constant speed based on a setup vehicle speed, and follow-up traveling control to cause the host vehicle to travel so as to follow another vehicle traveling ahead of the host vehicle at a predetermined inter-vehicle distance,
   wherein the traveling controller deactivates the traveling control at a time when a braking performance index, derived from the braking state information obtained by the information obtainer while the traveling control being in operation, is deemed to be decreased by more than a predetermined variation width, as compared with the braking performance index at a time of the traveling control having been activated,
   the information obtainer additionally obtains traveling route information of the host vehicle, and
   the traveling controller changes the predetermined variation width based on the traveling route information.

2. The traveling control apparatus as claimed in claim 1, wherein
   when the braking performance index at the time of the traveling control having been activated is lower than a first evaluation threshold serving as a reference for evaluating the braking performance index, the traveling controller deactivates the traveling control at a time when the braking performance index, derived from the braking state information obtained by the information obtainer while the traveling control being in operation, is deemed to be decreased by more than the predetermined variation width, as compared with the braking performance index at the time of the traveling control having been activated.

3. The traveling control apparatus as claimed in claim 2, wherein
   even when the braking performance index, derived from the braking state information obtained by the information obtainer while the traveling control being in operation, is not decreased by more than the predetermined variation width, as compared with the braking performance index at the time the traveling control having been activated, the traveling controller deactivates the traveling control at a time when the braking performance index, derived from the braking state information while the traveling control being in operation, is deemed to be decreased to a value less than or equal to a second evaluation threshold, which is lower than the first evaluation threshold.

4. The traveling control apparatus as claimed in claim 3, wherein
   the traveling controller prohibits the traveling control from being activated, when the braking performance index, derived from the braking state information obtained by the information obtainer, is less than or equal to the second evaluation threshold at a time of activating the traveling control being requested.

5. The traveling control apparatus as claimed in claim 4, wherein
   even when the traveling control is controlled to be activated by a passenger of the host vehicle requesting activation, the traveling controller keeps a state of prohibiting the traveling control from being activated, while the traveling control is prohibited from being activated.

6. The traveling control apparatus as claimed in claim 1, wherein when the braking performance index at a time of the traveling control having been activated is evaluated to be higher than a first evaluation threshold, the traveling controller deactivates the traveling control at a time when the braking performance index, derived from the braking state information obtained by the information obtainer while the traveling control being in operation, is deemed to be decreased to a value less than or equal to a third evaluation threshold, which is lower than the first evaluation threshold by the predetermined variation width.

7. The traveling control apparatus as claimed in claim 1, wherein
activating the traveling control is prohibited after the traveling control is deactivated, until the braking performance index, derived from the braking state information obtained by the information obtainer, exceeds a fourth evaluation threshold, which is higher than the first evaluation threshold.

8. The traveling control apparatus as claimed in claim 1, wherein
even when the traveling control is controlled to be activated by a passenger of the host vehicle requesting activation, the traveling controller deactivates the traveling control based on an increase or decrease of the braking performance index, derived from the braking state information obtained by the information obtainer, instead of operation by the passenger of the host vehicle.

9. The traveling control apparatus as claimed in claim 1, wherein
the time of the traveling control having been activated is set to a time when a start operation for activating the traveling control is made.

10. The traveling control apparatus as claimed in claim 1, wherein
the time of the traveling control having been activated is set to a time before the start operation for activating the traveling control is made.

11. The traveling control apparatus as claimed in claim 1, wherein
the time of the traveling control having been activated is set to a time after the start operation for activating the traveling control is made.

12. A traveling control apparatus used for executing traveling control of a host vehicle, the apparatus comprising:
an information obtainer, as a part of an adaptive cruise control ECU (Electronic Control Unit) in the host vehicle, configured to obtain braking state information of a braking device in the host vehicle; and
a traveling controller configured to execute at least one type of traveling control of constant speed traveling control to cause the host vehicle to travel at a constant speed based on a setup vehicle speed, and follow-up traveling control to cause the host vehicle to travel so as to follow another vehicle traveling ahead of the host vehicle at a predetermined inter-vehicle distance,
wherein the traveling controller deactivates the traveling control at a time when a braking performance index, derived from the braking state information obtained by the information obtainer while the traveling control being in operation, is deemed to be decreased by more than a predetermined variation width, as compared with a braking performance index derived from the braking state information at the time when the last braking operation had been completed before the traveling control has been activated,
the information obtainer additionally obtains traveling route information of the host vehicle, and
the traveling controller changes the predetermined variation width based on the traveling route information.

* * * * *